US012728372B2

(12) United States Patent
Boogers et al.

(10) Patent No.: US 12,728,372 B2
(45) Date of Patent: Sep. 8, 2026

(54) BRINE INJECTION SYSTEM WITH IMPROVED FILTERING SYSTEM

(71) Applicant: GEA FOOD SOLUTIONS BAKEL B.V., Bakel (NL)

(72) Inventors: George Lambertus Josephus Maria Boogers, Uden (NL); Jacobus Johannes Maria Van Der Laak, Milheeze (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 1191 days.

(21) Appl. No.: 17/621,374

(22) PCT Filed: Jun. 29, 2020

(86) PCT No.: PCT/EP2020/068211
§ 371 (c)(1),
(2) Date: Dec. 21, 2021

(87) PCT Pub. No.: WO2021/008863
PCT Pub. Date: Jan. 21, 2021

(65) Prior Publication Data

US 2022/0347605 A1 Nov. 3, 2022

(30) Foreign Application Priority Data

Jul. 12, 2019 (EP) .................................... 19185950

(51) Int. Cl.
*B01D 33/46* (2006.01)
*A23B 4/28* (2006.01)
(Continued)

(52) U.S. Cl.
CPC ........... *B01D 33/463* (2013.01); *A23B 4/285* (2013.01); *A23L 13/72* (2016.08);
(Continued)

(58) Field of Classification Search
CPC .......... A23B 4/28; B01D 29/035; B07B 1/04; B07B 1/02
See application file for complete search history.

(56) References Cited

U.S. PATENT DOCUMENTS 4,113,626 A * 9/1978 Detcher ................ B01D 35/28 209/264
4,472,274 A * 9/1984 Williams ............ B01D 29/945 D23/209

(Continued)

FOREIGN PATENT DOCUMENTS

DE 202010000494 U1 8/2011
ES 2015398 A6 8/1990

(Continued)

OTHER PUBLICATIONS

International Search Report and Written Opinion, mailed on Sep. 16, 2020, for International Application PCT/EP2020/068211.

(Continued)

*Primary Examiner* — Steven W Crabb
*Assistant Examiner* — Spencer H. Kirkwood
(74) *Attorney, Agent, or Firm* — The Dobrusin Law Firm, P.C.

(57) ABSTRACT

A brine injection system with a plurality of needles, which are inserted into a product and through which brine is injected into the product. Brine which does not end up in the product is collected and recycled, and during recycling, the brine flows through a filter. The filter includes a filter element, along which unfiltered brine flows in a flow-direction and through which filtered brine passes and which holds back residues in the unfiltered brine. The filter element includes a multitude of slots, each with a main extension direction which extends parallel to the flow direction of the brine.

14 Claims, 5 Drawing Sheets

(51) Int. Cl.

| | |
|---|---|
| ***A23L 13/72*** | (2023.01) |
| ***B01D 33/03*** | (2006.01) |
| ***B01D 33/80*** | (2006.01) |

(52) U.S. Cl.

CPC ....... *B01D 33/0346* (2013.01); *B01D 33/806* (2013.01); *A23V 2002/00* (2013.01); *B01D 2201/082* (2013.01); *B01D 2201/287* (2013.01)

(56) References Cited

U.S. PATENT DOCUMENTS

| | | | |
|---|---|---|---|
| 4,620,478 A | 11/1986 | Corominas | |
| 6,494,167 B1 * | 12/2002 | Chen ................. | B01D 29/6484 119/447 |
| 2002/0152901 A1 | 10/2002 | Basile et al. | |
| 2005/0077254 A1 | 4/2005 | Sawhill et al. | |
| 2018/0243797 A1 | 8/2018 | Wojciechowski | |
| 2018/0279636 A1 | 10/2018 | Poos | |

FOREIGN PATENT DOCUMENTS

| | | | | |
|---|---|---|---|---|
| FR | 2264601 A1 | 10/1975 | | |
| GB | 367379 A | 2/1932 | | |
| GB | 1502985 A | 3/1978 | | |
| WO | 00/61259 A1 | 10/2000 | | |
| WO | WO-2016083250 A1 * | 6/2016 | .............. | A23B 4/28 |

OTHER PUBLICATIONS

International Preliminary Report on Patentability, mailed on Jun. 24, 2021, for International Application PCT/EP2020/068211.

Chinese Office Action, dated Aug. 27, 2023, for Chinese patent application No. 2020800433321.

* cited by examiner 22
w
X
21

8

22
w
X
21
8

BRINE INJECTION SYSTEM WITH IMPROVED FILTERING SYSTEM

CROSS REFERENCE TO RELATED APPLICATIONS

This application is a US National Phase of PCT/EP2020/068211 filed on Jun. 29, 2020, which claims priority to EP 19185950.3 filed on Jul. 12, 2019, all of which are hereby incorporated by reference herein for all purposes.

FIELD

The present invention relates to a brine injection system with a plurality of needles, which are inserted into a product and through which brine is injected into the product, wherein brine which does not end up in the product is collected and recycled and wherein during recycling, the brine flows through a filter.

BACKGROUND

Such a system is well known from the state of the art, for example from WO2016/083250. A needle head with a plurality of needles reciprocates from a remote- to an injection position, in which the needles have been pushed into a product which is marinated with a brine. A typical product is meat, poultry and/or fish but other products are also feasible. After the needles have entered the product, the brine is forced out of a hole(s) for example in the needle tip. In most cases not all of the brine ends up in the product and/or remains in the product after the injection. This brine is then collected and recycled. Depending on the line solution also brine from a shaker or a flip over belt will be collected and recycled. Before re-entering the needles, the return brine needs to be filtered. The filter system of a current injector system comprises a first rotating drum filter and eventually a second rotating drum filter, a suction filter and in-line filters. A first rotating drum filter will filter animal proteins, fat particles, bone- and cartilage-fragments from the return brine and transfers it towards a scraper which will scrape the filtrate off the drum and direct the filtrate into a reservoir. Harder particles like bone and cartilage are scraped-off easily while for example “jelly” meat proteins can penetrate through the filter openings and will be mixed with the filtered return brine due to the scraper action. In this case a second rotating drum filter will be provided downstream from the first drum filter in order to further filter the return brine. However, due to the active scraper action of this second filter, over time, loose floating material like “jelly” meat proteins can mix again with the filtered return- and fresh brine.

Therefore, an additional suction filter will be used. Over time particles can also block the openings of this filter which will result in a reduced flow towards the manifold and needles and/or the loose particles will flow to the pump and through the needles and clog the needles.

Therefore in-line filters will be positioned after the pump and before the needles. Due to the positive pressure pump, smaller particles can even pass these in-line filters. Self-cleaning in-line filters can increase this effect by scraping the proteins through the drum of the filter. By the scraping action the filter openings can be blocked with for example “jelly” proteins. The penetrated material builds-up on the inside of the filter and flakes can detach and end-up in the hollow needles, these needles will be clogged which results in less injection performance.

Another disadvantage of the current filter system is the multitude of parts which all, at least once a day, must be disassembled from the injector, cleaned and thereafter reassembled. This is extremely time consuming and increases wear of the system.

SUMMARY

It is therefore the objective of the present invention to avoid the problems according to the state of the art and/or to improve known systems.

This problem is solved with a brine injection system with a plurality of needles, which are inserted into a product and through which brine is injected into the product, wherein brine which does not end up in the product is collected and recycled, wherein during recycling, the brine flows through a filter, wherein the filter comprises a filter element, along which the unfiltered brine flows in a flow-direction and through which the filtered brine passes and which holds back residues in the unfiltered brine, wherein the filter element comprises at least one, preferably a multitude, of slot(s) each with a main extension direction which extends parallel to the flow direction of the brine.

The present invention relates to a brine injection system, which comprises a plurality of needles, which are, in most cases provided in a needle head, which reciprocates from a remote- to an injection position, in which the needles have been pushed into a product which is marinated with a brine. A typical product is meat, poultry and/or fish but other products are also feasible. The brine is typically a watery solution with salt and/or other functional and/or taste enhancing substances. After the needles are in the product and/or before, the brine is forced out of a hole in the needle. However, not all of the injected brine ends up or remains in the product and is, according to the present invention, recycled, i.e. injected into a product again. Before this takes place, the recycled brine needs to be filtered, to remove fat, gel like particles, bone-pieces or the like from the brine which may clog the hollow needles.

The filtering is executed with a filter comprising a filter element, along which the unfiltered brine flows and through which the filtered brine passes and which holds back residues in the unfiltered brine. The held back residues are permanently or intermittently washed out of the filter with unfiltered or only partially filtered brine and preferably due to gravity. The filter in the inventive system has very few parts which need to be cleaned. This saves time and reduces damage due to wrong assembly. The filter element does not rotate and there is no continuous scraper action to scrape the filtrate from the surface of the filter element.

The filter element is preferably a screen. The filter element is preferably a modul, which can be removed from the filter easily and for example exchanged by a different modul and/or cleaned.

The filter element according to the present invention comprises at least one, preferably a multitude of, slot(s) each with a main extension direction which extends parallel to the flow direction of the brine. This filter element leads to very good filtering results, without clogging. The filter element can be cleaned easily.

In case there are a multitude of slots, the slots are preferably parallel to each other and provided more preferably equidistantly.

The length of the filter element is preferably 500-2000 mm. The width of each slot within the filter element is preferably 0.4-3.0 mm. The area of the slots through which the brine flows is preferably 10-60% of total area over which the brine flows.

Preferably, the filter element is at least locally, preferably entirely, inclined relative to a vertical and/or horizontal plane. Due to this inclination, the brine need not be pumped but flows by gravity along the filter element. The angle of inclination may vary with the flow length of the brine. Preferably, the angle of inclination relative to a horizontal plane decreases with increasing flow-length. The angle of inclination is preferably between 0 and 90° more preferably between 0 and 20°.

Preferably filter element is at least locally curved. The radius of the curvature can vary within the filter design in a broad range preferably between 800 till 8000 mm and will more preferably be in a range from 1000 till 3000 mm.

The unfiltered brine flows along the filter element by gravity and/or is pumped along the filter element. The filtered brine is forced through the filter element by gravity and/or by increased pressure, which, according to a preferred embodiment, can be controlled. The increased pressure can, for example be achieved by a higher brine level on top of the filter element. The pressure level need not be the same over the entire flow length of the filter element, but may vary.

According to a preferred embodiment of the present invention, the permeability of the filter element varies with the flow-length of the brine along the filter element. More preferably, the permeability increases with the flow-length of the brine along the filter-element, i.e. initially, the permeability is rather small and then increases as the brine proceeds along the filter element towards the end of the filter element. The permeability may change continuously or stepwise. According to a preferred embodiment, the permeability of the filter element can be adjusted. This adjustment may be executed manually or automatically.

Preferably, the filter element is a screen, preferably a slotted screen, wherein the size of the slots preferably varies with the flow length of the unfiltered brine along the filter element. Preferably, the size of the slots/holes in the screen are initially smaller and then increases with the flow length of the unfiltered brine.

Preferably, the system comprises a chiller for the recycled brine, which is preferably located upstream from the filter. The chiller preferably cools the brine down to 2-4° C. and/or maintains the brine at this temperature range. Preferably, the chiller comprises a pump, which pumps the recycled brine from a reservoir to the filter.

According to a preferred embodiment of the present invention, the filter element vibrates to increase the filter-capacity of the filter element, particularly to improve removal of the residues.

According to a preferred embodiment, the system comprises an extra filter upstream from the needles and downstream from the main filter. Preferably, this extra filter comprises two filters, which are arranged in parallel, wherein only one filter is used. The other filter is stand by or can be cleaned in the meantime.

According to a preferred embodiment, the inventive brine injection system comprises a cleaning system, preferably a vacuum cleaner. The cleaning system removes particles, preferably meat-particles, and/or semi-solid particles, like jellylike particles from the surface of the filter element, so that this surface is not clogged. The vacuum cleaner is preferably designed such that it only removes solid particles, like meat-particles, and/or semi-solid particles, like jellylike particles, from the filter element and as little liquid brine as possible.

Preferably, the vacuum cleaner comprises a nozzle through which the particles are sucked in.

Preferably, the cleaning system comprises a moving device, which moves the cleaning system relative to the filter element of the main filter. This moving device can move in one or two directions parallel to the surface of the filter element. In case the filter element moves only in one direction, the width of the nozzle, in the direction perpendicular to its direction of movement, is preferably at least essentially like the width of the filter element. In case the moving device moves in two directions, the width of the nozzle is preferably smaller than the width of the cleaning device. The two direction of movement are preferably perpendicular to each other.

The surface of the filter element can be cleaned entirely or only partially.

Preferably, the cleaning system operates continuously or intermittently.

Preferably, the cleaning system comprises a sensor, which measures the flow of brine through the filter element. The signal of this sensor is preferably utilized to control the cleaning system. In case the flow of brine through the filter element falls below a certain level, the cleaning system can be activated.

Preferably, the cleaning system comprises recycle means to recycle brine, which is sucked in by the cleaning system.

BRIEF DESCRIPTION OF THE FIGURES

The invention is now explained according to the Figures. These explanations do not limit the scope of protection.

DETAILED DESCRIPTION

Figure 1:
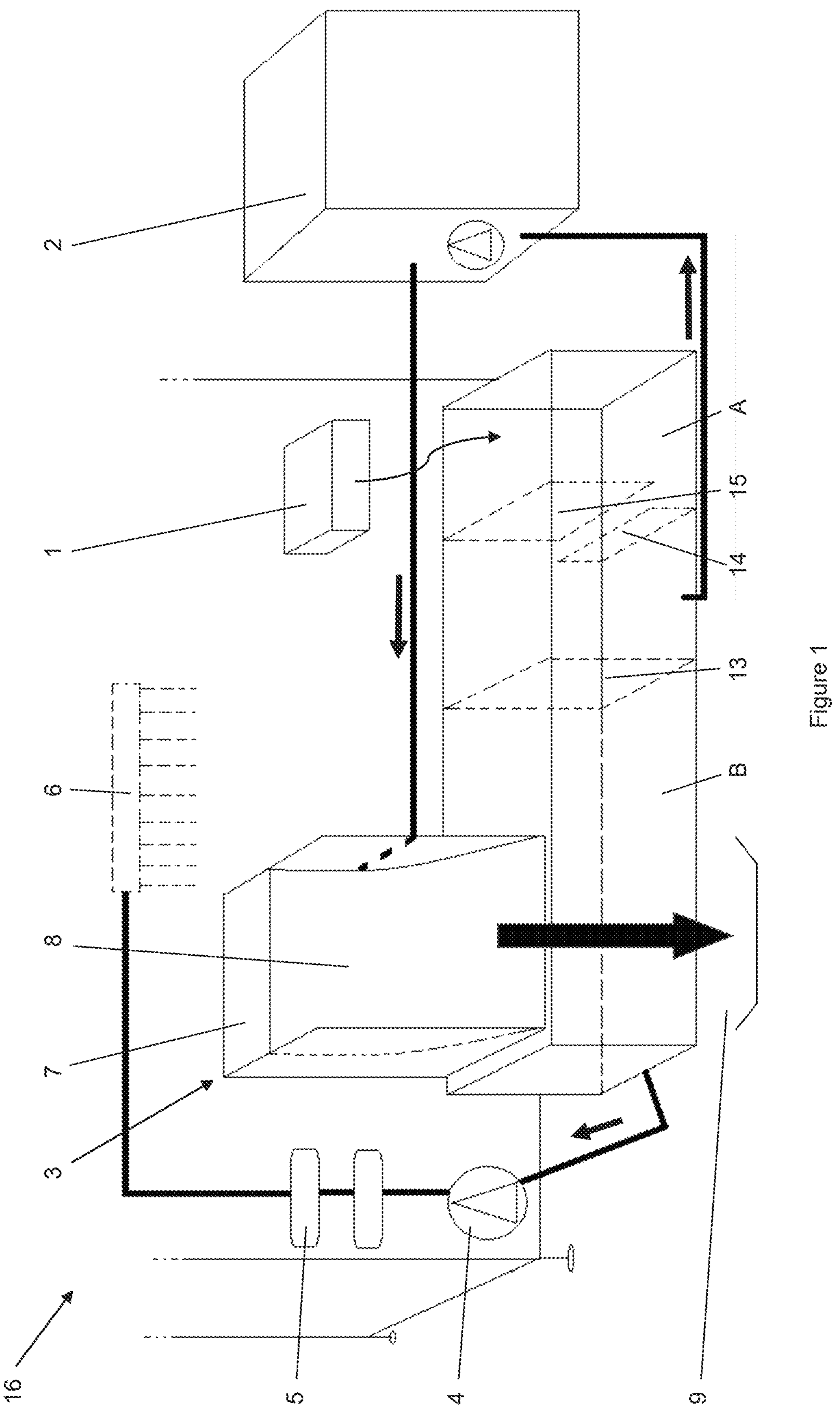
FIG. 1 shows the inventive system.

FIG. 1 shows the inventive system 16. The system comprises a needle-head 6 with a multitude of needles, which are reciprocated from a remote- to an injecting position. In the injection position, the needles stick in a product, for example meat, poultry, fish or vegetables and a brine is forced through the hollow needles into the product. Surplus brine is collected, for example underneath the belt of the injector which transports the product below the needles and away and the brine flows via out-flow 1 to segment "A" of a brine tank. In segment "A" the return brine can be polluted with proteins, fat particles, bone- and cartilage-fragments. As a first cleaning step, two optional plates 14, 15, one connected at the top of the tank and a small one connected at the bottom of the tank are positioned a distance from each other such that heavier material could descend and fat will float on top.

Figure 2:
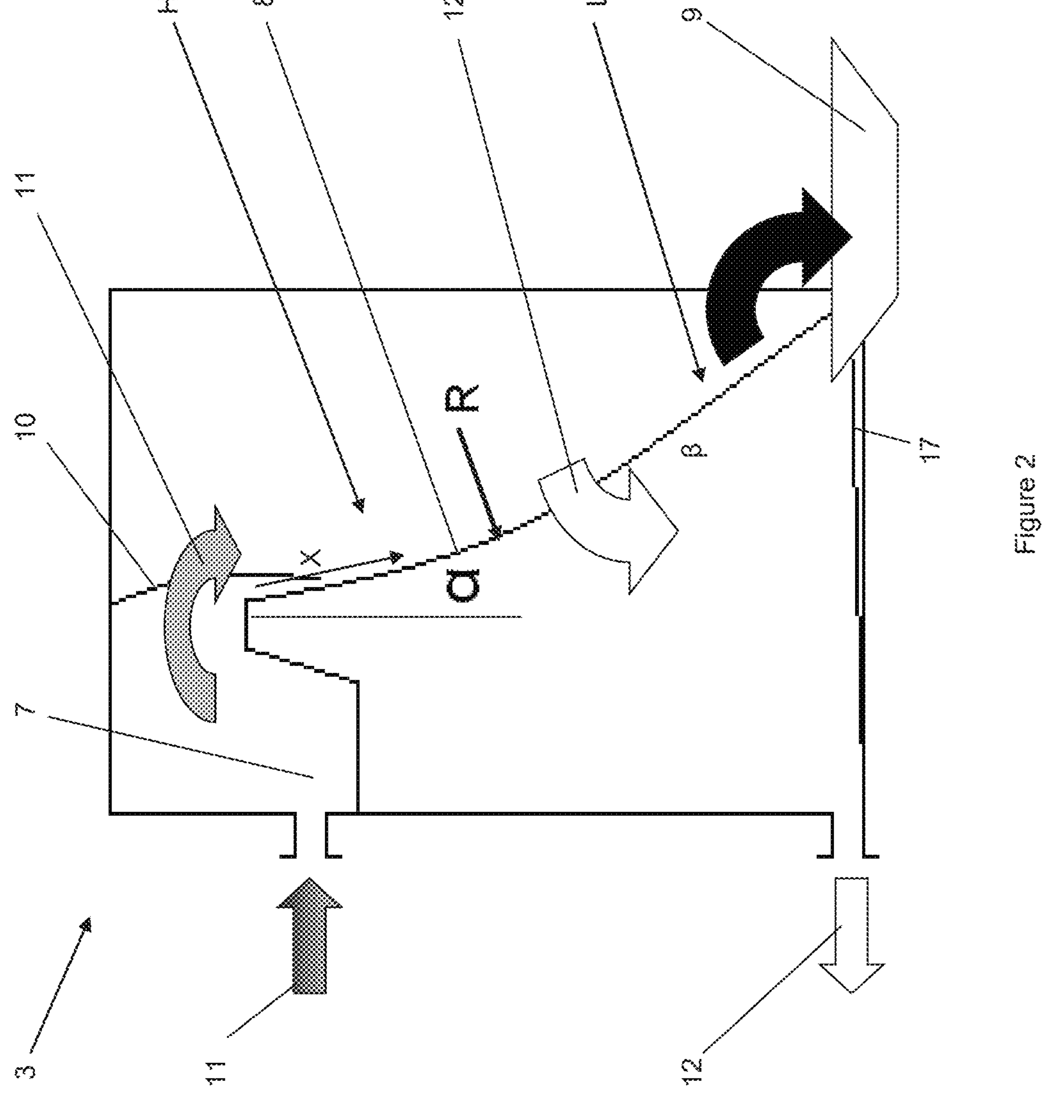
FIG. 2 shows details of the filter.

In the embodiment according to FIG. 1, a GEA SuperChill® 2 is used to pump the eventually pre-cleaned return brine from tank "A" into an integrated cooling block so that the brine temperature of preferably 2-4° C. will be maintained. In case the return brine temperature and environment temperature will not influence the preferred brine temperature range, the GEA SuperChill® could also be replaced with a conventional pump and a control system to turn the pump on/off and manage the flow speed and level control in tank "A" to protect the pump for dry-pumping. The GEA SuperChill® or the separate pump pumps the return brine towards the inlet connection at the back of main filter 3 as shown in FIG. 2. In the optional reservoir 7 of the filter 3 the pumped return brine collects and will start to over-flow over the filter element 8. A weir 10 can be provided to force the unfiltered brine towards the filter element 8. Instead of a weir 10 or additionally to a weir 10 a reservoir 7 can be provided preferably with brine guiding means which can be straight and/or convex and/or concave in order to guide the brine such that it will be distributed over the entire reservoir 7.

Flow speed and amount of return brine is depending on the injection rate, e.g. injection mode, pump pressure and/or needle-head speed but also on belt load, product, brine type etc. but can be easily managed by the flow regulator of the pump 2. The filtrate will flow out of the filter 3 and will be collected in tank segment "B". Here it will preferably be mixed with cold and fresh brine, which has a preferred temperature of 2-4° C. The brine is then pumped via injector pump 4 through one of the in-line filters 5, which are, however, only optional. In case any material is dropped in segment "B" accidentally, for example by human interference, the in-line filter(s) will catch this debris. Preferably these filters 5 are provided by-passable such that one filter can be taken out to inspect/clean without interrupting the production. Valves will control which filter is in use before the brine is consumed by the injector's manifold and needles 6.

Referring now to FIG. 2, the unfiltered or pre-filtered brine 11 is flowing along the filter element 8, indicated by the arrow X, which depicts the flow length of the brine along the filter element. As the brine flows along the filter element 8, a portion of filtered brine 12 will pass the filter element 8 and will be caught beneath the filter element 8. Here a sloped bottom 17 guides the filtered brine to an exit, which is connected to the tank in segment "B". Instead or additional to a sloped bottom other guiding means and/or collecting means can be applied in order to guide filtered brine back to the tank in segment "B". The residues accumulate at the top of the filter element 8 and will be washed out by the stream of unfiltered brine 11 and here due to gravity. At the end of the filter element 8, the residues are collected in a reservoir 9 and discharged. Preferably reservoir 9 is perforated such that residues will be caught and unfiltered brine will be separated for recycling in order to save brine. Therefor the unfiltered brine will be directed towards tank "A". The filter element 8 is preferably a modular build-up screen deck. Depending on the brine viscosity, brine ingredients, pollution degree and used needles in the injector, optimization of the filter process can be desirable. This can be achieved in different ways, for example by adjusting the angle of inclination $\alpha$ and or $\beta$ of screen 8 and/or varying the permeability, for example the mesh size when using a slotted screen, with the flow length X of the brine, by, for example, choosing a smaller permeability at location "H", i.e. a smaller flow length and a larger permeability at location "L", i.e. a larger flow length. The angle of inclination $\alpha$ is preferably smaller at the smaller flow length of the brine along the filter element and preferably increases at least locally with increasing flow length. This results in higher velocity of the unfiltered brine at the beginning of the filtering process, which decreases with increasing flow length. To improve the slide and/or roll down of residue, the filter element 8 is preferably curved as shown by reference sign "R". In case an optimization of the filter process is not sufficient a filter element 8 with a different slope, for example curvature "R" can be used. The filter elements 8 are preferably provided as moduls and can be exchanged based on the desired application. Further optimization can be achieved by using a vibrating screen 8.

Figure 3:
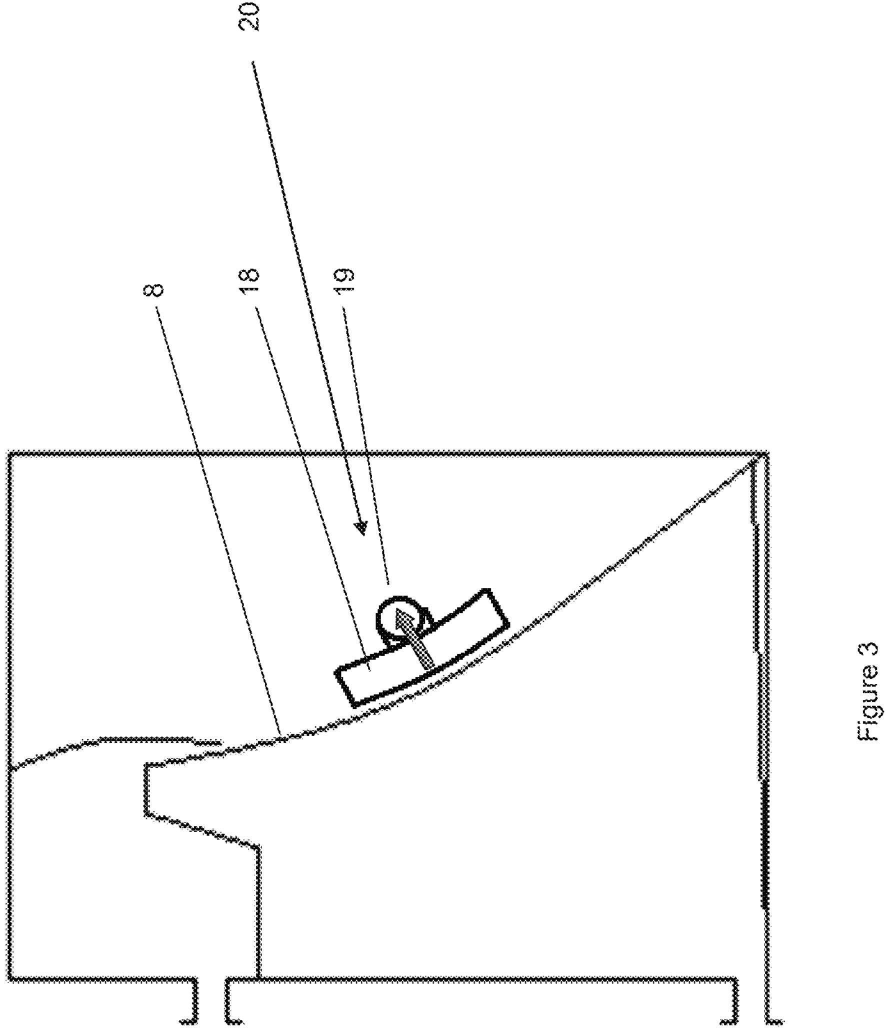
FIG. 3 shows the cleaning device.

FIG. 3 shows the cleaning system 20, which is in the present case a nozzle 18 which is connected to a vacuum source to remove solid- and/or jellylike-particles from the surface of the filter element 8. This is done to avoid clogging of the filter element 8. The cleaning system is designed such that it preferably removes as little brine from the surface of the filter element as possible. The cleaning system 20, preferably the nozzle 18 is preferably connected to a moving device (not depicted), which moves the cleaning system 20 and/or the nozzle 18 relative to the surface of the filter element. The moving device can move the cleaning system 20 and/or the nozzle in one or two directions parallel to the surface of the filter element 8. The moving pattern preferably depends on the size of the cleaning device and/or the nozzle.

The surface of the filter element 8 can be cleaned partially or entirely. The cleaning can take place continuously or intermittently. The cleaning system may comprise a sensor which, for example, measures directly or indirectly, the flow through the filter element. Depending on the signal of the sensor, the cleaning system is either activated or deactivated.

Preferably, the cleaning system comprises a sensor which measures the amount of brine removed from the surface of the filter element 8. In case this amount is too large, the cleaning system is either adjusted and/or stopped.

Brine removed from the surface of the cleaning system is preferably recycled to the system and reused.

Figures 4A, 4B:
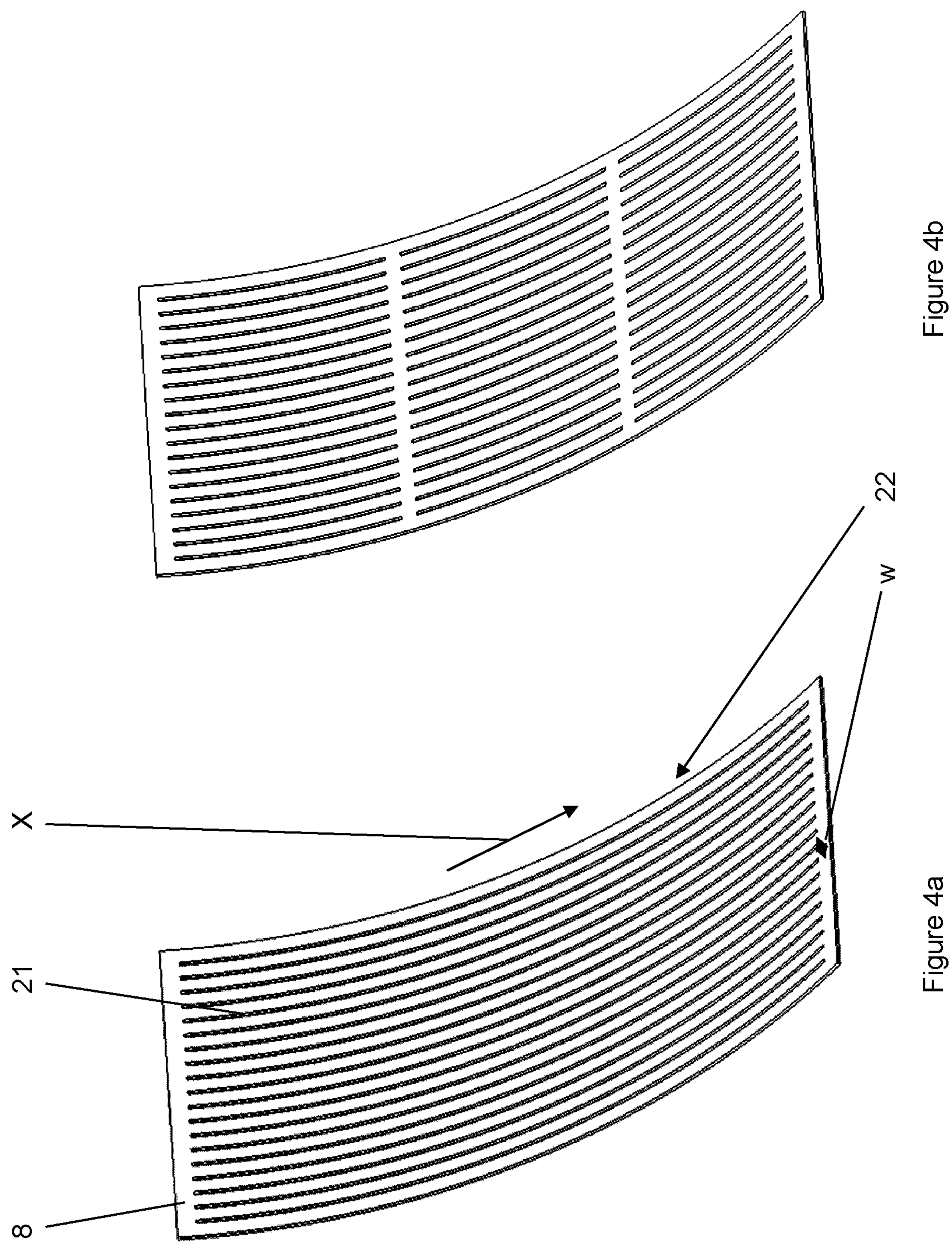
FIG. 4*a* shows the filter element.
FIG. 4*b* shows the slots are interrupted.

FIG. 4*a* shows an embodiment of the filter element. In the present case, the filter element is at least locally curved and is proved at least locally inclined relative to a horizontal plane. The unfiltered brine flows along the filter element as depicted by the large arrow and as also depicted by the arrow X. The area that is in contact with the brine is the filter area 22. In this area at least one, preferably a multitude, here four, slots 21 are provided. The slots 21 preferably extend parallel to the flow-direction of the brine. Each slot has a main extension direction, which is preferably parallel to the flow-direction X of the brine. The slots are provided preferably equidistantly and more preferably have all the same width w and/or length. The width is preferably 0.4-3.0 mm. The length of the filter element is preferably 500-2000 mm. All slots cover preferably 10-60% of the filter area 22. In FIG. 4*b* the slots are interrupted due to strength and stiffness reasons.

Figures 5A, 5B:
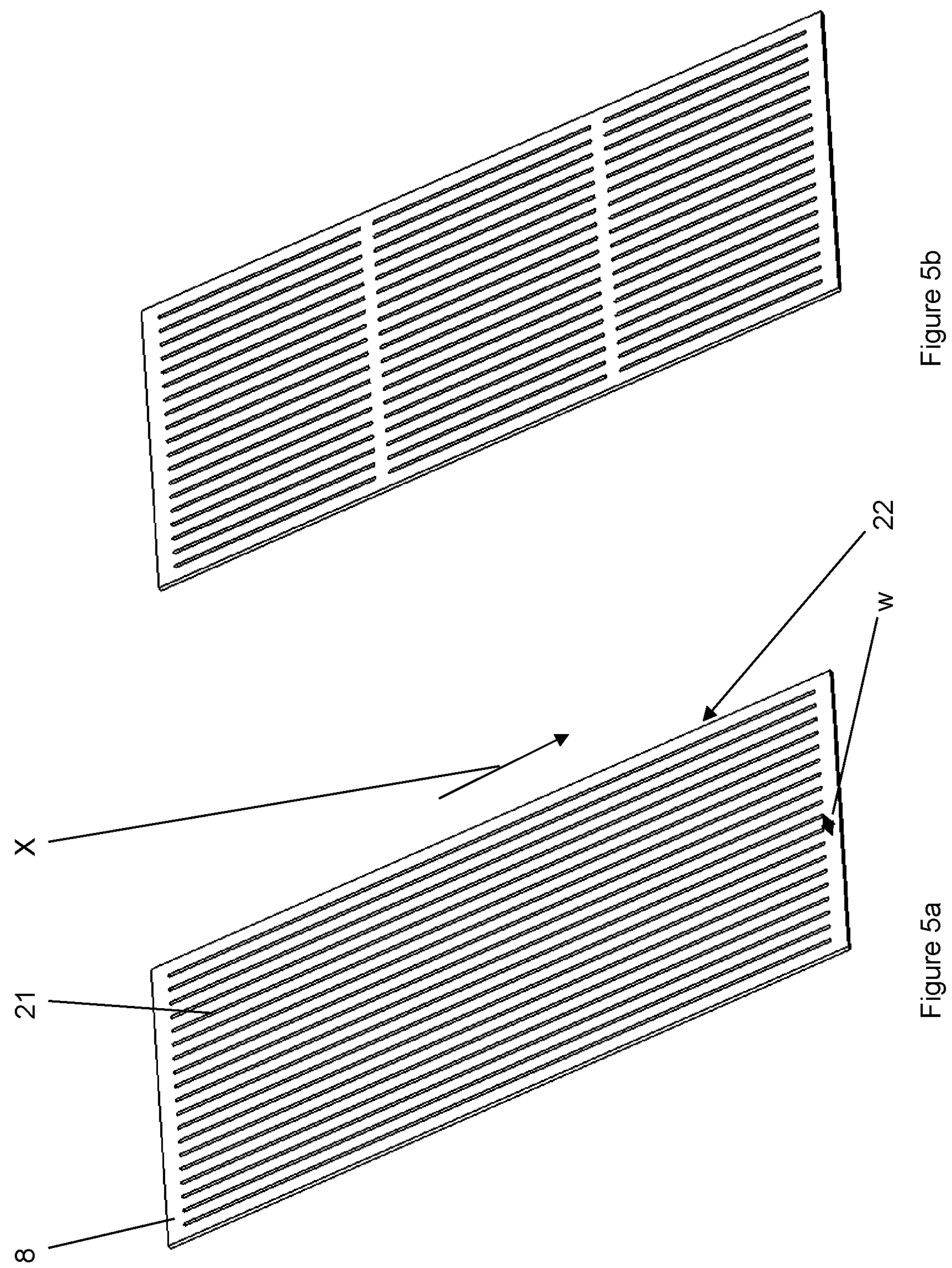
FIG. 5*a* shows the filter element.
FIG. 5*b* shows the slots are interrupted.

FIG. 5*a* shows an embodiment of the filter element wherein the filter element is straight and not curved. The filter element can comprise out of multiple straight elements connected to each other wherein the relative angle between the multiple elements varies. In FIG. 5*b* the slots are interrupted.

A not shown embodiment comprises a combination of a curved filter element(s) connected to straight filter element (s) in order to direct the flow-direction X of the brine as desired.

In all shown embodiments the slots extending parallel to the flow-direction X of the brine however slots directed with a slightly different angle preferably between 0 and 30 degrees compare to flow-direction X will also be disclosed by the invention.

LIST OF REFERENCE SIGNS

1 outflow

2 pump, chiller

3 main filter
4 pump
5 inline filter
6 needles, needle-head
7 reservoir
8 filter element
9 residues
10 weir
11 flow of unfiltered brine
12 flow of filtered brine
13 separation tank
14 separation plate
15 separation plate
16 brine injection system
17 sloped bottom
18 nozzle vacuum cleaner
19 connection to vacuum cleaner
20 cleaning system, vacuum cleaner
21 slot
22 filter area
A first segment tank
B second segment tank
H filter region with a first permeability
L filter region with a second permeability
R curvature of the filter element
X flow direction of the brine, flow length, main extension direction
$\alpha$ angle of inclination, relative to a vertical plane
$\beta$ angle of inclination, relative to a horizontal plane

The invention claimed is:

1. A brine injection system with a plurality of needles, which are inserted into a product and through which brine is injected into the product, wherein the brine which does not end up in the product is collected and recycled, wherein during the recycling, the brine flows through a filter, the filter comprises a filter element, along which unfiltered brine flows in a flow-direction and through which filtered brine passes and which holds back residues in the unfiltered brine, wherein the filter element comprises a multitude of slots, each with a main extension direction which extends parallel to the flow direction of the brine,
   wherein the filter element is at least locally or entirely inclined relative to a vertical and/or horizontal plane,
   wherein the filter element is at least locally curved,
   wherein the brine flows along and through the filter element by gravity.

2. The brine injection system according to claim 1, wherein a permeability of the filter element varies with a flow-length of the brine along the filter element.

3. The brine injection system according to claim 2, wherein the slots are provided equidistantly.

4. The brine injection system according to claim 1, wherein the brine injection system comprises a chiller for the brine.

5. The brine injection system according to claim 1, wherein the filter element is a screen.

6. The brine injection system according to claim 1, wherein the filter element vibrates.

7. The brine injection system according to claim 1, wherein the brine injection system comprises an extra filter upstream from the plurality of needles.

8. The brine injection system according to claim 1, wherein the brine injection system comprises a cleaning system.

9. The brine injection system according to claim 8, wherein the cleaning system operates continuously or intermittently.

10. The brine injection system according to claim 8, wherein the brine injection system comprises a sensor, which measures a flow of brine through the filter element and the signal of the sensor is utilized to control the cleaning system.

11. The brine injection system according to claim 8, wherein the brine injection system comprises recycle means to recycle brine, which is sucked in by the cleaning system.

12. The brine injection system according to claim 8, wherein the cleaning system comprises a vacuum cleaner.

13. The brine injection system according to claim 1, wherein a length of the filter element is between 500 mm and 2000 mm.

14. The brine injection system according to claim 13, wherein a width of each slot of the multitude of slots is between 0.4 mm and 3.0 mm.

* * * * *